US008464580B2

(12) United States Patent
Paul

(10) Patent No.: US 8,464,580 B2
(45) Date of Patent: Jun. 18, 2013

(54) APPARATUS FOR MAINTAINING TIRE PRESSURE

(76) Inventor: Daniel Paul, El Dorado Hills, CA (US)

( * ) Notice: Subject to any disclaimer, the term of this patent is extended or adjusted under 35 U.S.C. 154(b) by 245 days.

(21) Appl. No.: 12/851,362

(22) Filed: Aug. 5, 2010

(65) Prior Publication Data

US 2012/0031180 A1 Feb. 9, 2012

(51) Int. Cl.
*B60C 23/02* (2006.01)

(52) U.S. Cl.
USPC .......................................... 73/146.8; 73/146

(58) Field of Classification Search
None
See application file for complete search history.

(56) References Cited

U.S. PATENT DOCUMENTS

| | | | | |
|---|---|---|---|---|
| 5,359,886 | A * | 11/1994 | Pradelle | 73/146.2 |
| 5,535,623 | A * | 7/1996 | Heyns | 73/146.8 |
| 5,694,969 | A * | 12/1997 | DeVuyst | 137/226 |
| 5,886,254 | A * | 3/1999 | Chi | 73/146.8 |
| 5,979,232 | A * | 11/1999 | Halcomb | 73/146.8 |
| 6,055,854 | A * | 5/2000 | Chen | 73/146.8 |
| 6,293,297 | B1 * | 9/2001 | Maldonado et al. | 137/227 |
| 6,418,786 | B1 * | 7/2002 | Holcomb | 73/146.8 |
| 6,588,265 | B1 * | 7/2003 | Roberson | 73/146.8 |
| 6,615,651 | B1 * | 9/2003 | Barbanti | 73/146.2 |
| 7,251,994 | B2 * | 8/2007 | Maldonado et al. | 73/146.8 |
| 7,253,725 | B2 * | 8/2007 | Breed et al. | 340/447 |
| 7,421,889 | B2 * | 9/2008 | Lin | 73/146 |

* cited by examiner

*Primary Examiner* — Lisa Caputo
*Assistant Examiner* — Jermaine Jenkins

(57) ABSTRACT

An apparatus to maintain optimal air pressure in a tire of a vehicle may use centrifugal force to compress air which may be delivered to the tire when the tire has low air pressure. The necessary centrifugal force to compress air may be achieved through the rotation of the tire itself. A weight may be disposed, in a chamber, near the center of rotation of a tire. The weight may be held in place with a spring or similar device. As the tire rotates, the weight may be forced outward, compressing air present in the cylinder. If the air pressure within the tire is low, the weight will compress air from inside the cylinder into the tire. The apparatus may act autonomously to add air to a low pressure tire, as opposed to simply notifying the driver that tire pressure is low.

10 Claims, 3 Drawing Sheets

12
10
18
14
16
10
18

12
10
18
14
16
18
10

10
26
22

20
18
24
30
28
32
12

10
26
22
20
20
18
24
28
30
12
32

12
10
18
16
14
18
10

10
26
22
20
18
24
38
40
46
34
44
48
12
42

10
26
22
20
20
18
24
38
46
48
34
44
12
40
42

APPARATUS FOR MAINTAINING TIRE PRESSURE

BACKGROUND OF THE INVENTION

The present invention relates to an apparatus for maintaining tire pressure and, more particularly, to a centrifugal air compressor that automatically maintains the optimal air pressure in a tire.

By maintaining optimal tire pressure, the miles per gallon of fuel a car may achieve can be maximized, tire lifespan can be maximized and premature tire blow-outs can be minimized to prevent potential accidents. Some automobiles include a tire pressure warning system that may indicate to a driver when the vehicle's tire pressure is too low. These systems may be useful to notify the driver that service is needed, but do not solve the problem of low tire pressure.

Some automobiles may use tires that are impervious to puncture. While these tires may not lose pressure from a puncture, their use may be frowned upon by public safety organizations, as these tires may render police spike strips ineffective.

As can be seen, there is a need for an apparatus that may keep a tire inflated to its proper pressure.

SUMMARY OF THE INVENTION

In one aspect of the present invention, an apparatus for maintaining air pressure in a tire comprises a housing; a weight disposed within the housing; a compression chamber adapted to compress air contained therewithin when the weight moves into the compression chamber; and a valve adapted to deliver the compressed air into the tire, wherein the housing is disposed on a rim of the tire and centrifugal forces acting on the weight during rotation of the tire causes the weight to move into the compression chamber.

In another aspect of the present invention, an apparatus for maintaining air pressure in a tire comprises a housing; a weight disposed within the housing; a spring returning the weight to a static position when there is no centrifugal force acting on the weight; a compression chamber adapted to compress air contained therewithin when the weight moves into the compression chamber due to centrifugal force acting on the weight; a valve adapted to deliver the compressed air into the tire; an air input valve, the air input valve adapted to permit air to enter the compression chamber when the weight returns to the static position; and an air exit valve, the air exit valve adapted to release the compressed air from the compression chamber when the tire has at least a predetermined minimum air pressure, wherein the housing is disposed on a rim of the tire and centrifugal forces acting on the weight during rotation of the tire causes the weight to move into the compression chamber.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides an apparatus to maintain proper air pressure in a tire of a vehicle. The apparatus may use centrifugal force to compress air which may be delivered to the tire when the tire has low air pressure. The necessary centrifugal force to compress air may be achieved through the rotation of the tire itself. A weight may be disposed, in a chamber, near the center of rotation of a tire. The weight may be held in place with a spring or similar device. As the tire rotates, the weight may be forced outward, compressing air present in the cylinder. If the air pressure within the tire is low, the weight will compress air from inside the cylinder into the tire. The apparatus of the present invention may act autonomously to add air to a low pressure tire, as opposed to simply notifying the driver that tire pressure is low.

Figure 1:
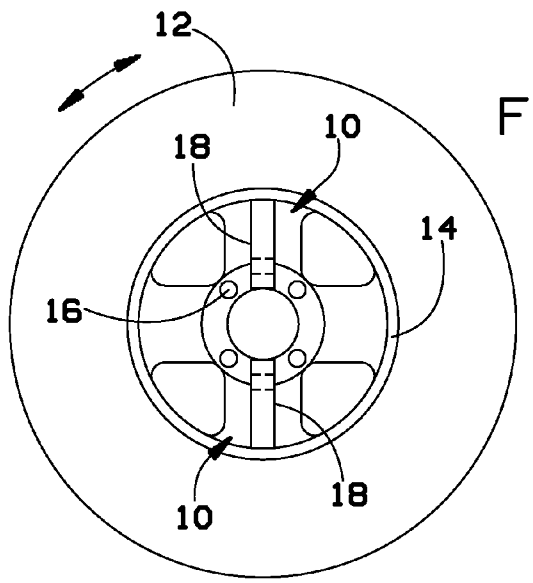
FIG. 1 is a front view of the tire pressure maintenance device according to an embodiment of the present invention.
Figure 2:
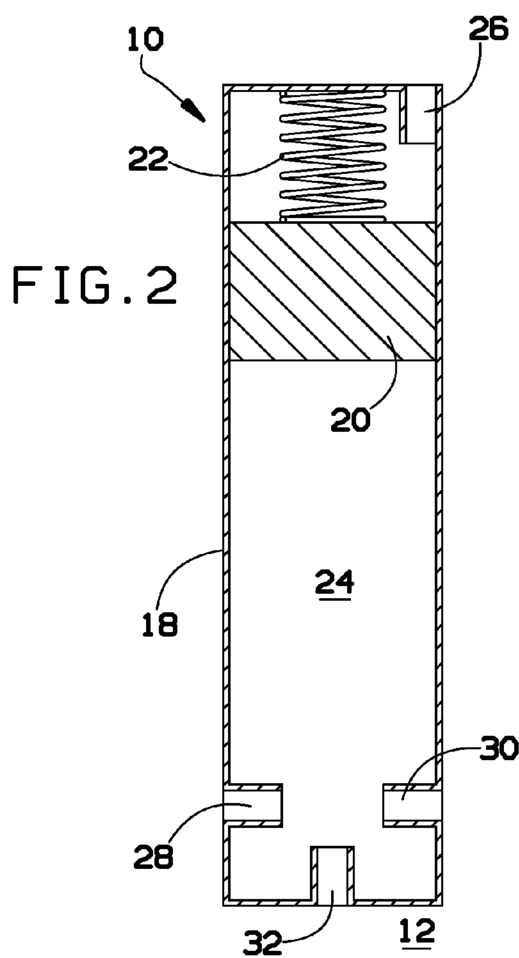
FIG. 2 is a detailed section view of the tire pressure maintenance device shown in FIG. 1 in a static position.
Figure 3:
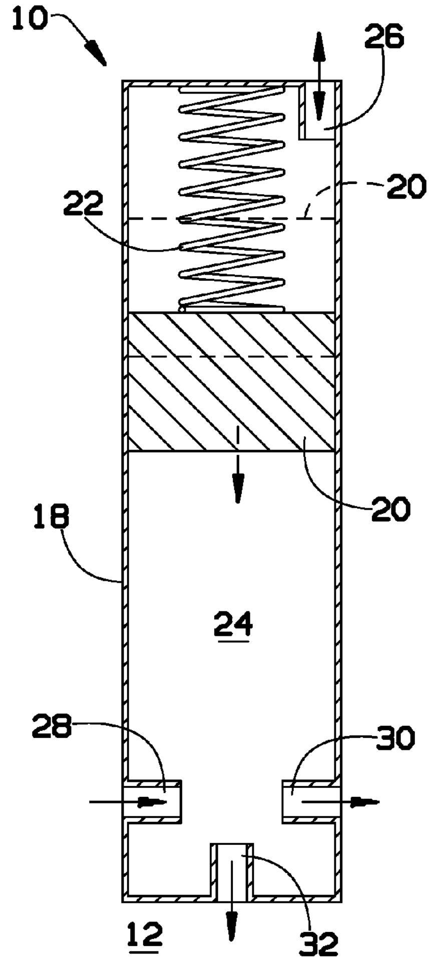
FIG. 3 is a detailed section view of the tire pressure maintenance device shown in FIG. 1 in a dynamic position.

Referring to FIGS. 1 through 3, a centrifugal air compressor 10 may be mounted on a rim 14 of a tire 12. For proper tire balance, more than one air compressor 10 may be mounted on the rim 14, each air compressor 10 being equally spaced radially around the rim 14. For example, as shown in FIG. 1, two air compressors 10 may be disposed 180 degrees from each other. In one embodiment, the air compressors 10 may be disposed between lug nuts 16.

The air compressor 10 may include a weight 20 disposed within a housing 18. The weight 20 may be held in a static position (as shown in FIG. 2) with a spring 22. As the tire 12 rotates, centrifugal force may cause the weight 20 to be resiliently displaced, as shown in FIG. 3, causing air in a compression chamber 24 to be compressed. An open port 26 may be disposed near the spring 22 to allow the weight 20 to move in the housing 18 without creating a vacuum behind the weight 20.

A plurality of ports may be disposed in the compression chamber 24. An air-to-tire valve 32 may permit the compressed air in the compression chamber 24 to be delivered to the tire 12 when the air pressure in the tire 12 is low. If the air pressure in the tire 12 is not low, the compressed air may flow out of an exit valve 30. The exit valve 30 may be configured to remain closed until the pressure in the compression chamber 24 exceeds the desired tire inflation pressure. Thus, if the tire air pressure is low, the compressed air will move through valve 32 into the tire, but, if the air pressure in the tire is correct, the compressed air will exit through the exit valve 30.

When the vehicle slows down or stops, the spring 22 may return the weight 20 to its static position (see FIG. 2). An input valve 28 may allow air to fill the compression chamber 24 as the weight 20 returns to its static position. Once the tire 12 begins to rotate again, the weight 20 may move to a dynamic position, again compressing air in the compression chamber 24.

In an exemplary embodiment, two diametrically opposed half-pound weights may be held close to the axis of rotation of the tire. The tire has a 1 foot radius, and the tire rim has a 0.7 foot radius. The combined effective force that these two half-pound weights would have at 0.6 feet from the center of rotation would be as follows (not including the force to overcome the springs):

| Miles per hour | Effective force (pounds) |
|---|---|
| 1 | 0.04 |
| 30 | 36 |
| 45 | 81 |
| 60 | 144 |

Although air pressure requirements will vary (typically from about 30 to about 80 pounds per square inch (psi)), the effective centrifugal force at typical driving speeds is more than sufficient to meet the psi requirements for tire inflation.

The effective force from the table above may be computed as follows. A tire with a 1 foot radius has a circumference of 6.28 feet. At 1 mile per hour, the car would be traveling at 1.5 feet per second. At this speed, the tire would make 0.23 rotations per second. Knowing that force equals mass times acceleration and that acceleration, with respect to the measurement of centrifugal force on an rotation object, is its velocity squared/radius, one can obtain the formula Force=(mass*velocity squared)/radius. In order to measure the velocity, one must compute the distance that would be traveled 0.6 feet from the center of rotation (this is the position of the weight). The circumference at 0.6 feet from the center of rotation is 3.768 feet, which can be used to determine the velocity (for example, at 1 mile per hour, or 1.5 feet per second, the velocity at 0.6 feet from the center of rotation would be 0.88 feet per second). Since a 1 pound weight has a mass of 0.0311 slugs, the effective centrifugal force, as shown in the above table, can be determined.

While the above embodiment describes using two half-pound weights, other size weights may be used. For example, lighter weights may compress a smaller air compression chamber to achieve the same psi as the heaver weights.

Figure 4:
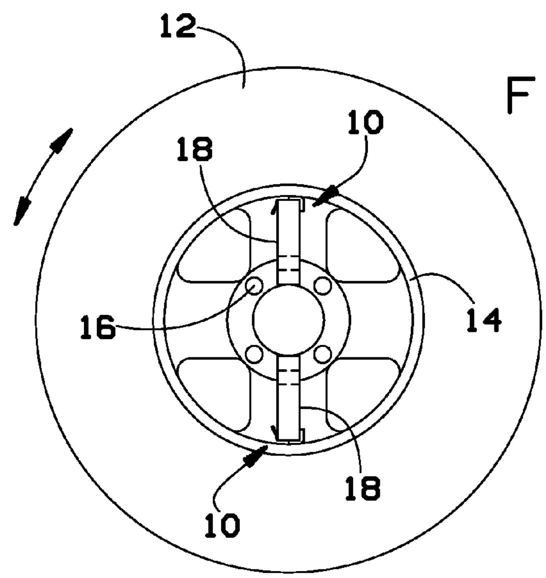
FIG. 4 is a front view of a tire pressure maintenance device according to an alternate embodiment of the present invention.
Figure 6:
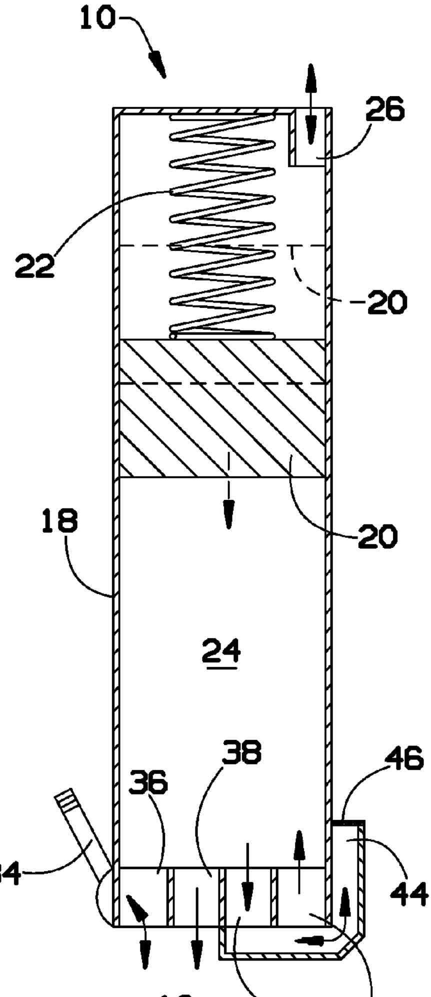
FIG. 6 is a detailed section view of the tire pressure maintenance device shown in FIG. 4 in a dynamic position.
Figure 5:
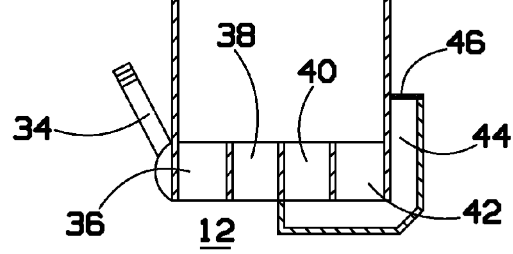
FIG. 5 is a detailed section view of the tire pressure maintenance device shown in FIG. 4 in a static position.

Referring now to FIGS. 4 through 6, a tire stem 34 may be provided to permit a user to fill their tire in a conventional manner. Air delivered through the tire stem 34 may be delivered to the tire via a valve 36. When two or more air compressors 10 are used, the multiple air compressors may be connected to one another. This might be done to reduce redundancy of the tire stem, values, or the open port. Another reason for doing this might be to help maintain tire balance, by ensuring that the two weights move outward at exactly the same distance from the center of rotation. Valve 38 may operate similarly to valve 32 of FIGS. 1 through 3. Valves 42 and 40 may operate similar to valves 28 and 30 of FIGS. 1 through 3, except that the input valve 42 may receive air through an open space 44 and exit valve 40 may expel air through the same open space 44. This configuration may help prevent the air input valve 42 from becoming clogged by debris. A screen 46 may be disposed on the open space 44 to further help prevent clogging of the input valve 42.

Figures 7, 8, 9:
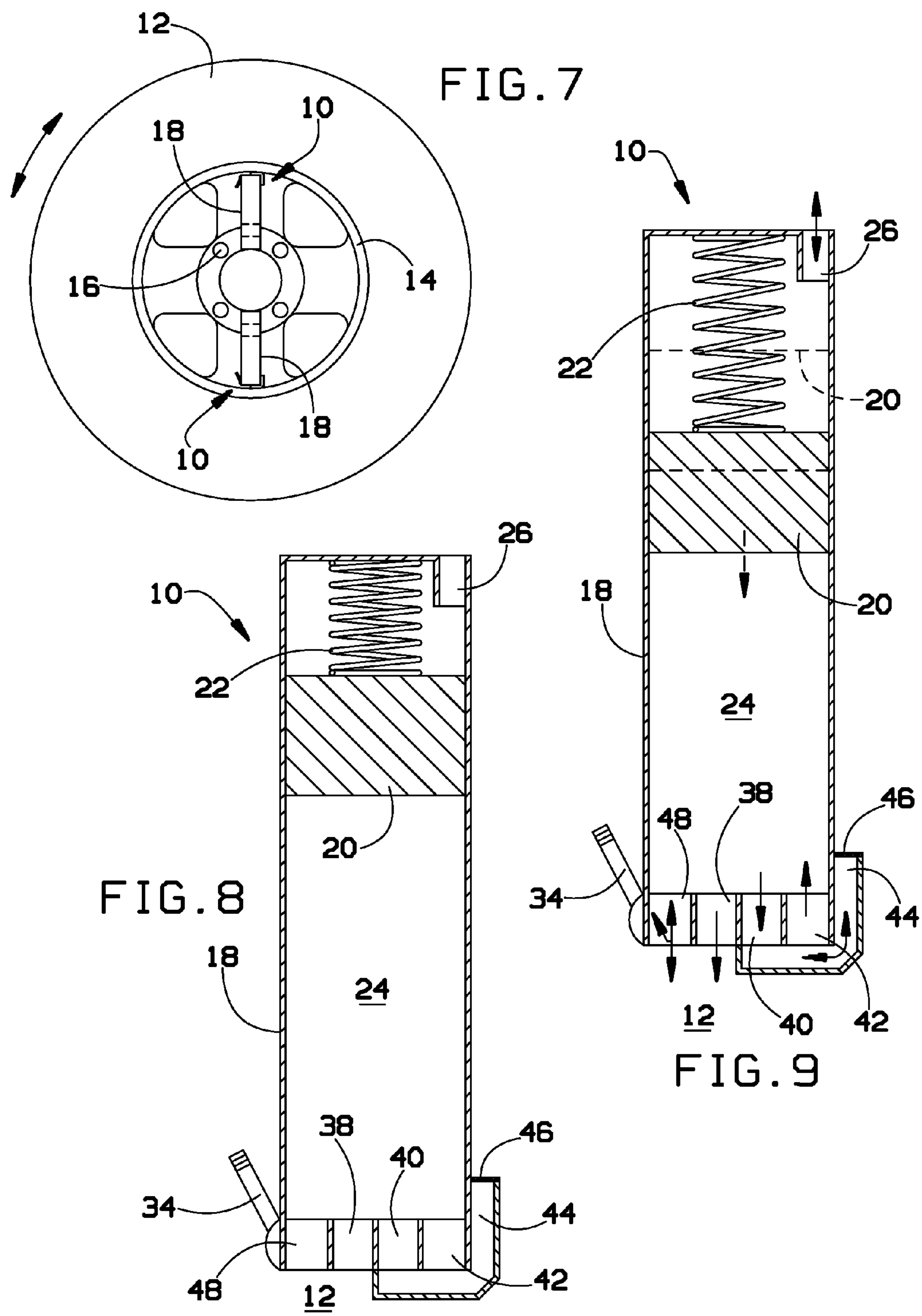
FIG. 7 is a front view of a tire pressure maintenance device according to an alternate embodiment of the present invention.
FIG. 8 is a detailed section view of the tire pressure maintenance device shown in FIG. 7 in a static position.
FIG. 9 is a detailed section view of the tire pressure maintenance device shown in FIG. 7 in a dynamic position.

Referring now to FIGS. 7 through 9, the valve 36 may not only allow air to be delivered into the tire 12, but may also allow air to be delivered into the compression chamber 24. By doing so, if the tire 12 is already properly inflated, air delivered into the compression chamber 24 via the valve stem 34 may be expelled via the air exit valve 40, rather than over-inflating the tire 12.

The apparatus described above may require little maintenance. For example, when a tire is replaced, the valves may be cleaned, the weights may be lubricated and the springs may be adjusted or replaced.

It should be understood, of course, that the foregoing relates to exemplary embodiments of the invention and that modifications may be made without departing from the spirit and scope of the invention as set forth in the following claims.

What is claimed is:

1. An apparatus for maintaining air pressure in a tire, comprising:
- a housing;
- a weight disposed within the housing;
- a plurality of compression chambers adapted to compress air into the tire from centrifugal forces caused by rotation of the tire when the weight moves into the compression chamber; and
- a valve adapted to deliver the compressed air into the tire,
- wherein the housing is disposed on a rim of the tire and the centrifugal forces act on the weight during rotation of the tire which causes the weight to move into the compression chamber.

2. The apparatus of claim 1, further comprising a spring returning the weight to a static position when there is no centrifugal force acting on the weight.

3. The apparatus of claim 2, further comprising an air input valve, the air input valve adapted to permit air to enter the compression chamber when the weight returns to the static position.

4. The apparatus of claim 1, further comprising an air exit valve, the air exit valve adapted to release the compressed air from the compression chamber when the tire has at least a predetermined minimum air pressure.

5. The apparatus of claim 1, wherein at least two of the apparatus are disposed equally about the circumference of the rim.

6. The apparatus of claim 1, further comprising a valve stem for delivering air to the tire.

7. The apparatus of claim 1, further comprising a valve stem for delivering air to the compression chamber, wherein air is delivered to the tire when the tire is below a predetermined minimum pressure and air is expelled from the compression chamber when the tire has a pressure of at least the predetermined minimum pressure.

8. The apparatus of claim 1, wherein the exit valve and input valve pass air through a common open chamber having a screen at an end thereof.

9. An apparatus for maintaining air pressure in a tire, comprising:
- a housing;
- a weight disposed within the housing;
- a spring returning the weight to a static position when there is no centrifugal force acting on the weight;
- an internal gauge sensing a first air pressure level as normal;
- a plurality of compression chambers adapted to compress air into the tire from centrifugal forces caused by rotation of the tire when a second air pressure is sensed to be lower than the first air pressure;

a valve adapted to deliver the compressed air into the tire;

an air input valve, the air input valve adapted to permit air to enter the compression chamber when the weight returns to the static position; and an air exit valve, the air exit valve adapted to release the compressed air from the compression chamber when the tire has at least a predetermined minimum air pressure, wherein the housing is disposed on a rim of the tire and centrifugal forces acting on the weight during rotation of the tire causes the weight to move into the compression chamber.

10. The apparatus of claim 9, further comprising a valve stem for delivering air to the compression chamber, wherein air is delivered to the tire when the tire is below a predetermined minimum pressure and air is expelled from the compression chamber through the air exit valve when the tire has a pressure of at least the predetermined minimum pressure.

* * * * *